United States Patent [19]

Matsumura

[11] Patent Number: 5,059,004
[45] Date of Patent: Oct. 22, 1991

[54] EYEPIECE SYSTEM
[75] Inventor: Takeshi Matsumura, Omiya, Japan
[73] Assignee: Fuji Photo Optical Co., Ltd., Saitama, Japan
[21] Appl. No.: 542,925
[22] Filed: Jun. 25, 1990
[30] Foreign Application Priority Data
  Jul. 28, 1989 [JP] Japan .................. 1-193998
[51] Int. Cl.$^5$ .............................................. G02B 9/18
[52] U.S. Cl. ............................................... 359/646
[58] Field of Search .......... 350/410, 423, 427, 96.25, 350/475, 480, 538
[56] References Cited
  U.S. PATENT DOCUMENTS

| | | | |
|---|---|---|---|
| 1,159,233 | 11/1915 | König | 350/410 |
| 4,425,025 | 1/1984 | Sunaga | 350/410 |
| 4,572,623 | 2/1986 | Tanaka et al. | 350/410 |
| 4,673,262 | 6/1987 | Tsuji | 350/538 |

FOREIGN PATENT DOCUMENTS 64-48809 3/1986 Japan .
1-108516 4/1989 Japan .

*Primary Examiner*—Bruce Y. Arnold
*Assistant Examiner*—Rebecca D. Gass

[57] ABSTRACT

An eyepiece system which can be used in the eyepiece portion of an endoscope. The eyepiece system comprises, in order from an eye point, a first positive lens having two convex surfaces, a second negative lens having a concave surface facing to the eye point side, and a third positive lens having a convex surface facing to the eye point side. Due to such construction, the eyepiece system can be compact and light in weight, and it also can provide a high magnification. Further, the eyepiece system has a sufficient eye point distance. Accordingly, the eyepiece system is an ideal eyepiece system for an endoscope.

9 Claims, 6 Drawing Sheets

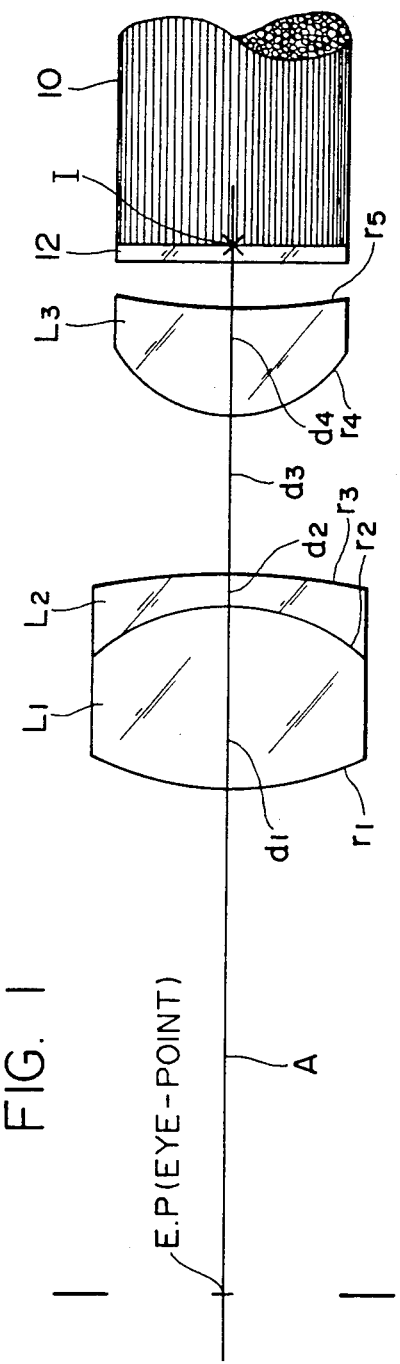
FIG. 1
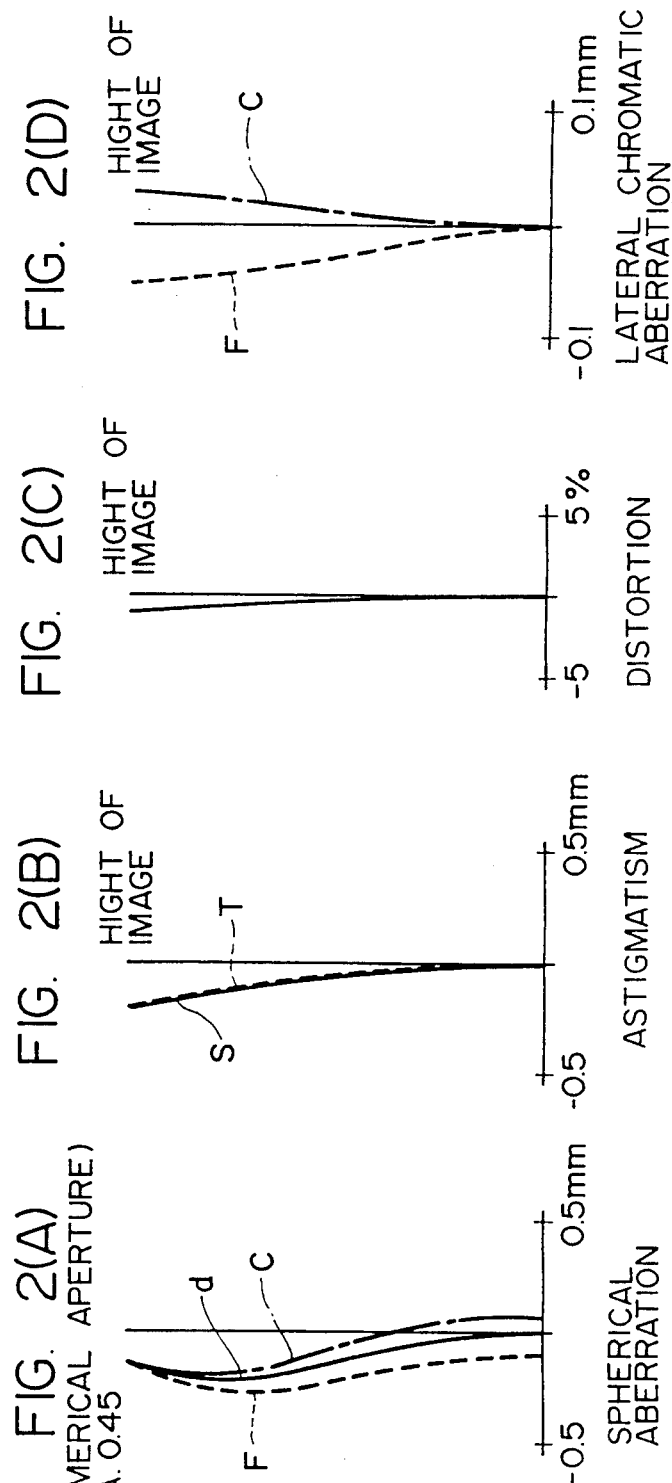
FIG. 2(A)
FIG. 2(B)
FIG. 2(C)
FIG. 2(D)

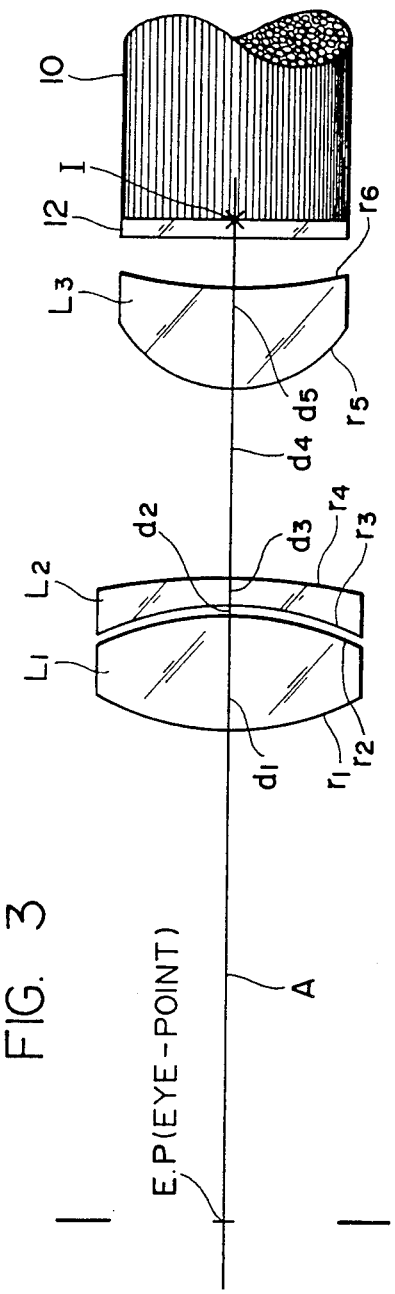
FIG. 3
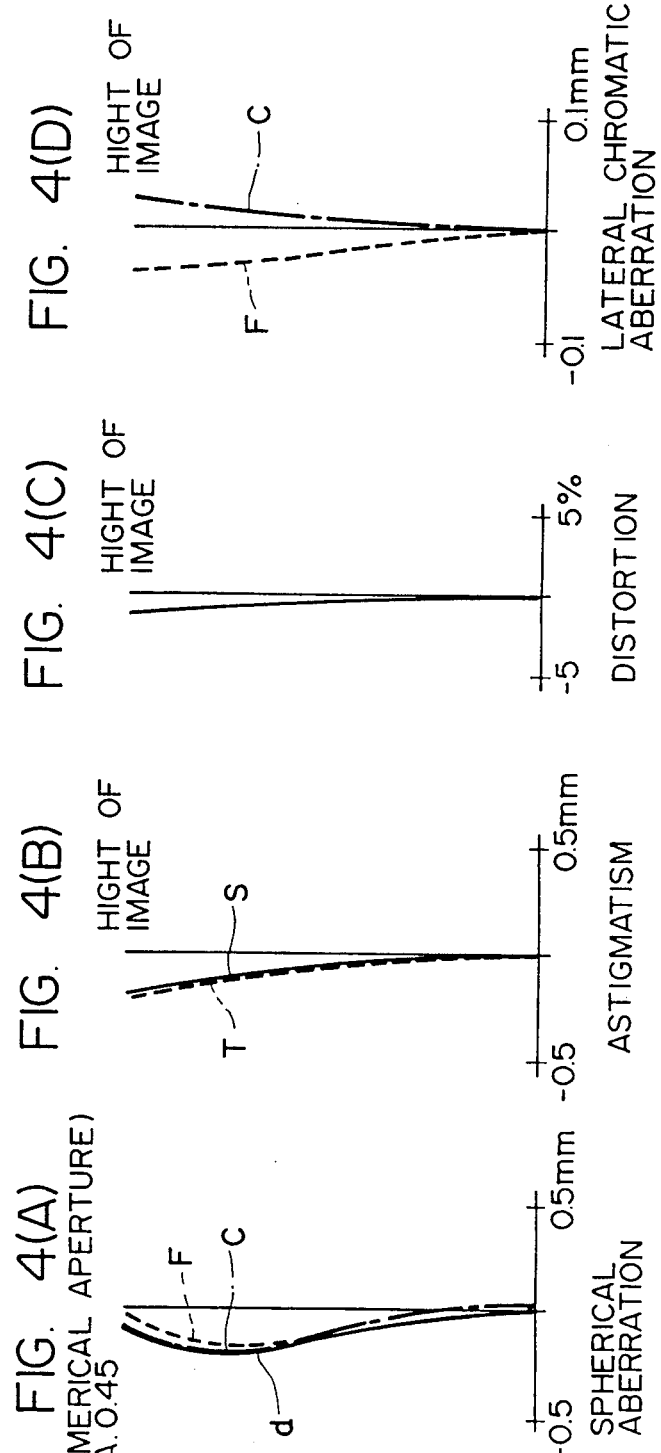
FIG. 4(A) (NUMERICAL APERTURE N.A. 0.45)
FIG. 4(B)
FIG. 4(C)
FIG. 4(D)

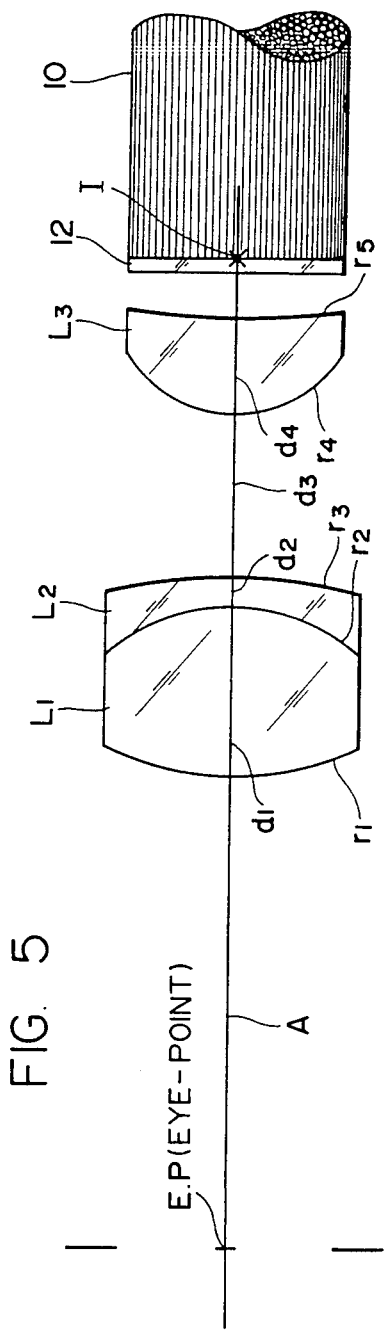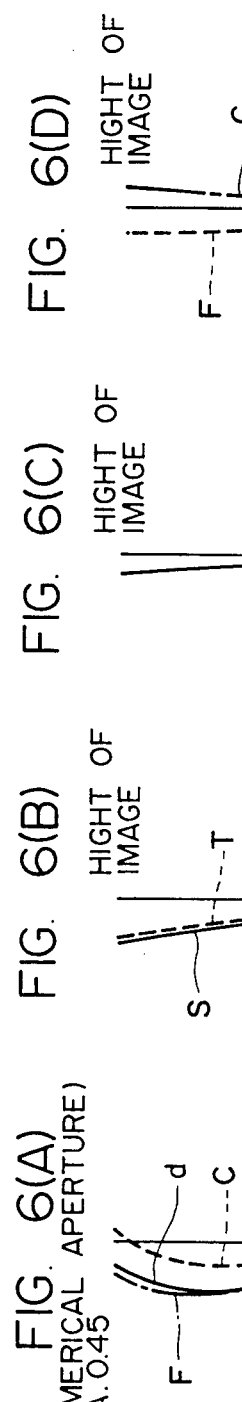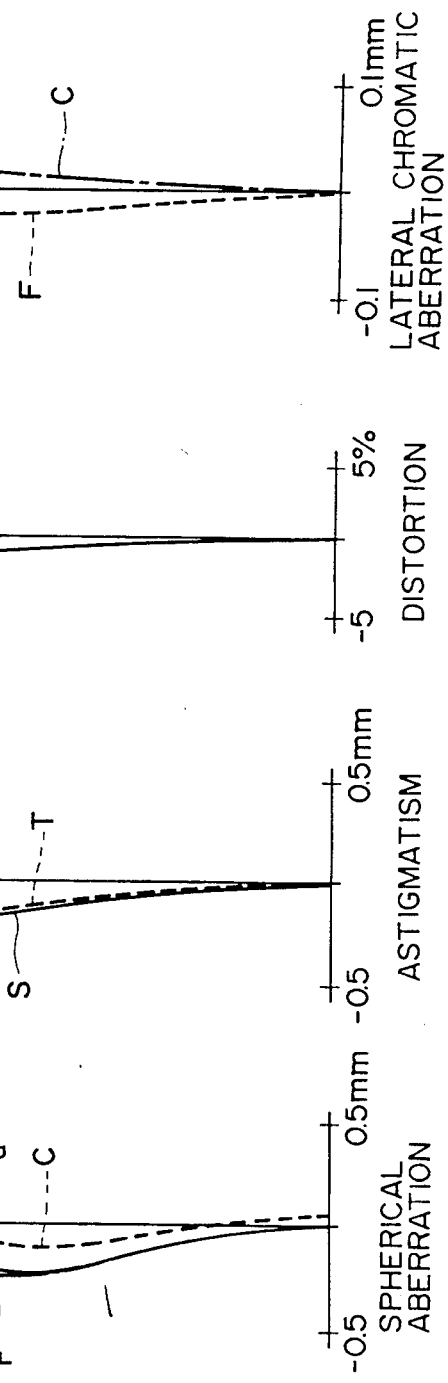

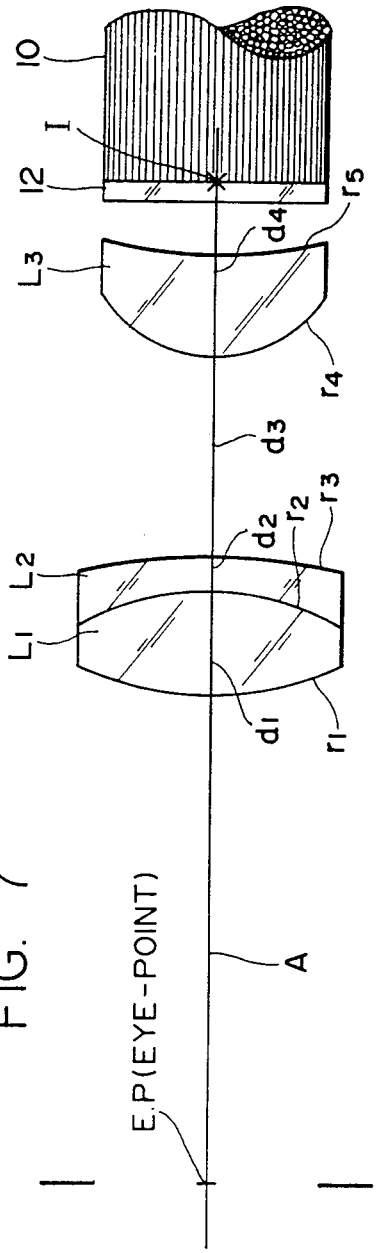
FIG. 7
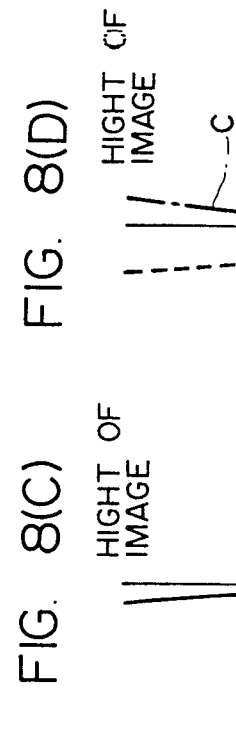
FIG. 8(A) (NUMERICAL APERTURE) N.A. 0.45 — SPHERICAL ABERRATION
FIG. 8(B) — ASTIGMATISM
FIG. 8(C) — DISTORTION
FIG. 8(D) — LATERAL CHROMATIC ABERRATION

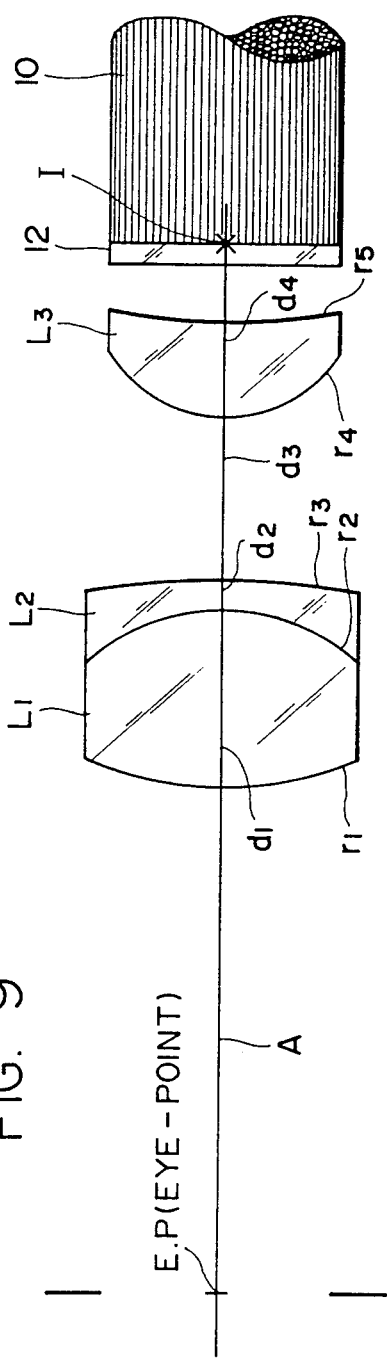
FIG. 9
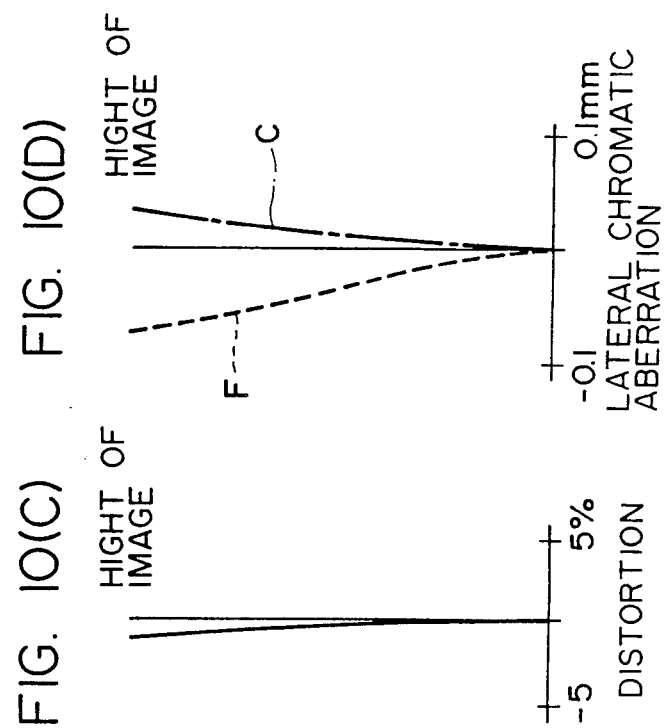
FIG. 10(A) (NUMERICAL APERTURE) N.A. 0.45
FIG. 10(B) ASTIGMATISM
FIG. 10(C) DISTORTION
FIG. 10(D) LATERAL CHROMATIC ABERRATION

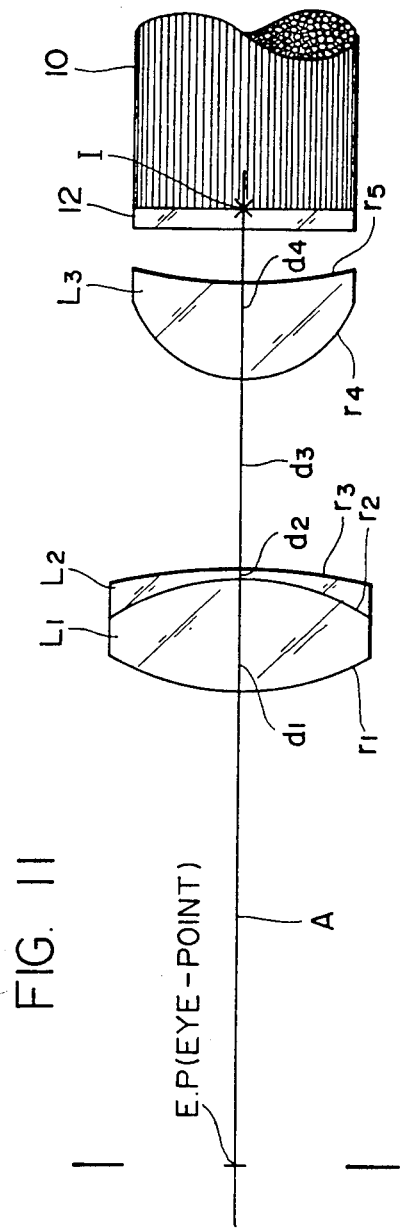
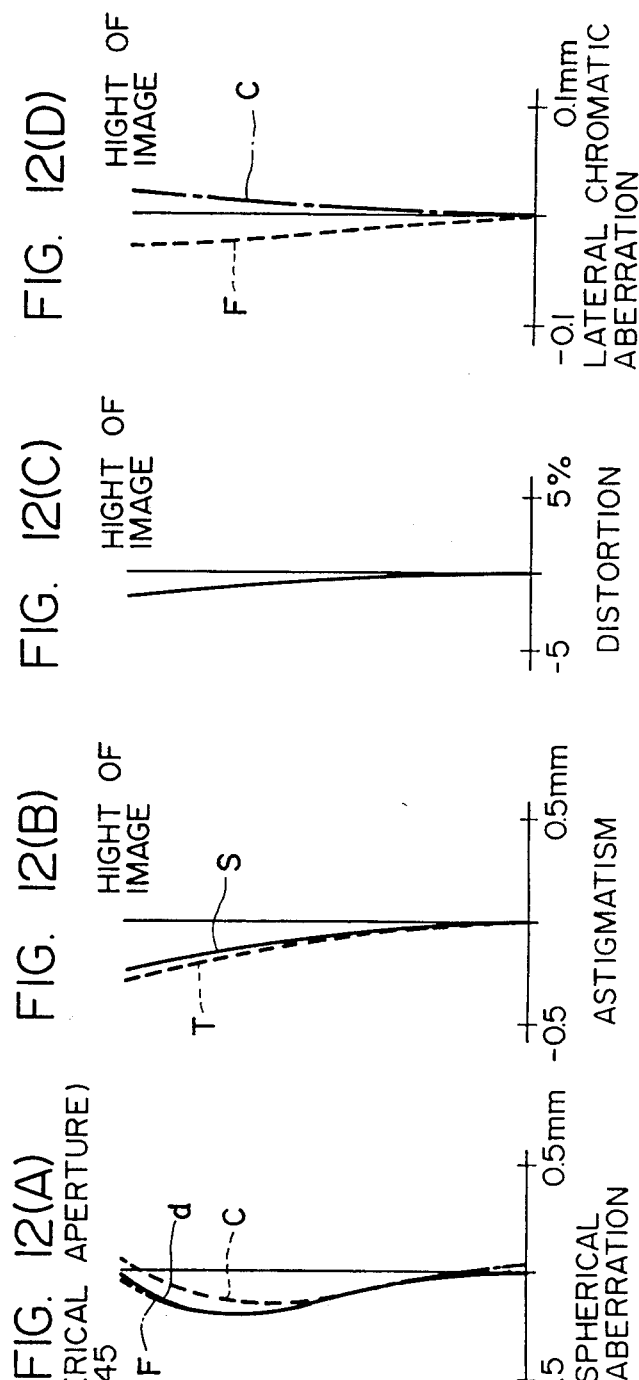

EYEPIECE SYSTEM

BACKGROUND OF THE INVENTION

1. Field of the Invention

The present invention relates to an eyepiece system and, in particular, to an eyepiece system having a high magnification which is suitable for use in an endoscope.

2. Description of the Related Art

An eyepiece system for use in an endoscope is an optical system which enlarges images sent from a leading end of an insertion portion of the endoscope through optical fiber bundles to an eyepiece portion of a hand control section of the endoscope so that the image can be observed. Since a surface to be observed thereof, that is, the end surface of the optical fiber bundles is generally very small in size, which an eyepiece system has a low ocular magnification, then the image observed by means of such eyepiece system is too small to observe, making it difficult for proper inspection and diagnosis to be executed by such endoscope.

This means that the larger image is necessary for observation and, therefore, it is essential that the focal length of an eyepiece system is made shorter.

Also, for easier observation of image from an eyepiece system, it is necessary that the distance (the eye point distance) from the eyepiece system to the pupil position of an observer is or make long.

Further, in order for the whole eyepiece system to be small in size, light in weight and inexpensive, it is desired that the eyepiece system is simplified in structure with a smaller number of components.

As an eyepiece system which is developed in consideration of the above-mentioned requirements, there are known eyepiece systems which are respectively disclosed in Japanese Patent Application Laid-open (Tokkai) No. 61-48809 and Japanese Patent Application Laid-open (Tokkai) No. 1-108516.

However, these eyepiece systems are those which are used in finder optical systems of electronic still cameras and also require a back focal distance, respectively. In general, when the combined focal length of a whole eyepiece system is designated as f, then the eyepiece magnification can be expressed by 250/f. According to the above-mentioned eyepiece systems, due to the fact that the eyepiece magnification thereof is in the order of 11 to 20 times, if such an eyepiece system is used for an endoscope, only a very small image can be observed through the eyepiece. Also, since such a system has only an short eye point distance ranging from 0.8 f to 0.9 f, it is not easy for an observer to observe the image through the eyepiece.

SUMMARY OF THE INVENTION

The present invention aims at eliminating the drawbacks found in the above-mentioned prior art eyepiece systems.

Accordingly, it is an object of the invention to provide an eyepiece system which has a simplified structure comprising only three lens elements, and also which has a very large eyepiece magnification of 34 times, has a sufficient back focal distance for a diopter adjustment, and has an eye point distance of 2.0 f or so.

According to the invention, there is provided an eyepiece system which comprises, in order seen from an observer's eye side, a first positive lens $L_1$ having two convex surfaces, a second negative lens $L_2$ having a concave surface facing to the observer's eye side, and a third positive lens $L_3$ having a convex surface facing to the observer's eye side.

According to the invention, due to the simplified construction comprising only three lenses, that is, a positive lens, a negative lens and a positive lens arranged sequentially from the eye side, the whole eyepiece system is small in size and light in weight. Also, the present system has a very large eyepiece magnification of 34 times, a sufficient back focal distance, and a sufficient eye point distance.

Here, the focal length of the whole eyepiece system is designated as f; the focal length of the first lens $L_1$ as $f_1$; the focal length of the second lens $L_2$ as $f_2$; the Abbe number of the first lens $L_1$ as $\nu_1$: the Abbe number of the second lens $L_2$ as $\nu_2$; the Abbe number of the third lens $L_3$ as $\nu_3$; and the refractive index of the third lens $L_3$ with respect to a d line as $N_3$.

Under the above-mentioned circumstances, there is obtained the following condition.

$$1.5 < |f_1 \times f_2|/f^2 < 3.6 \tag{1}$$

The condition represented by the expression (1) defines the lens powers of the first and second lenses $L_1$ and $L_2$. In other words, this is a condition which can make the whole lens system small in size and can keep respective aberrations in a good balance.

When in excess of the upper limit of the condition (1), it not only becomes difficult to correct a spherical aberration since the aberration is increased but also becomes difficult for the eyepiece system to be smaller in size since an effective diameter of the second lens $L_2$ is also increased. On the other hand, when below the lower limit of the condition (1), the spherical aberration, comatic aberration, axial chromatic aberration and the like are out of balance, especially a tangential performance is deteriorated to a great extent.

Also, there is obtained another condition.

$$\nu_1 - \nu_2 > 25, \tag{2}$$

The condition represented by the expression (2) defines the Abbe numbers of the first and second $L_1$ and $L_2$, that is this is a condition to enchance an axial chromatic aberration. In the present lens system, the chromatic aberration is corrected mainly in accordance with a relationship between the Abbe numbers of the first and second lenses $L_1$ and $L_2$.

When below the lower limit of the condition (2), it becomes difficult to correct a chromatic aberration sufficiently. For this reason, in order to provide the best possible chromatic aberration, it is effective that the difference between the Abbe numbers of the first positive lens $L_1$ and the second negative lens $L_2$ is made as great as possible.

Further, there is obtained still another condition.

$$N_3 > 1.6, \; \nu_3 > 40 \tag{3}$$

The condition (3) defines the refractive index and Abbe number of the third lens $L_3$ with respect to a d line. In other words, this is a condition to keep the image surface of the third lens $L_3$ or astigmatism thereof and the lateral chromatic aberration thereof in a desired level.

If the lower limit of $N_3 > 1.6$ in the condition (3) is not satisfied, the image surface of the eyepiece is made to fall down towards the eyepiece and, therefore, the best focused position of the center and the adjoining portions thereof is shifted out of place. Also, the radius of curvature of the lens is decreased to keep the positive lens power, which makes it difficult to polish the lens. In order to solve this problem, there is a way to increase the thickness of the central portion of the lens. From the viewpoint of reduction of the size and weight of the lens, such increased thickness turns unfavorable.

Also, if the lower limit of $\nu_3 > 40$ in the condition (3) is not satisfied, then the lateral chromatic aberration of the lens is increased to thereby lower the resolution of the adjoining portions thereof.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is a schematic view exemplifying a construction of a first embodiment of the eyepiece system according to the invention;

FIGS. 2(A)-2(D) are aberration diagrams for the first embodiment of the invention;

FIG. 3 is a schematic view exemplifying a construction of a second embodiment of the eyepiece system according to the invention;

FIGS. 4(A)-4(D) are aberration diagrams for the second embodiment of the invention;

FIG. 5 is a schematic view exemplifying a construction of a third embodiment of the eyepiece system according to the invention;

FIGS. 6(A)-6(D) are aberration diagrams for the third embodiment of the invention;

FIG. 7 is a schematic view exemplifying a construction of a fourth embodiment of the eyepiece system according to the invention;

FIGS. 8(A)-8(D) are aberration diagrams for the fourth embodiment of the invention;

FIG. 9 is a schematic view exemplifying a construction of a fifth embodiment of the eyepiece system according to the invention;

FIGS. 10(A)-10(D) are aberration diagrams for the fifth embodiment of the invention;

FIG. 11 is a schematic view exemplifying a construction of a sixth embodiment of the eyepiece system according to the invention;

FIGS. 12(A)-12(D) are aberration diagrams for the sixth embodiment of the invention.

DETAILED DESCRIPTION OF THE INVENTION

Detailed description will hereunder be given of the preferred embodiments of an eyepiece system according to the present invention with reference to the accompanying drawings.

In the following description, the following reference characters are used and they are respectively defined as follows:

$L_1$ to $L_3$: first lens to third lens;

m: number of lens surfaces in order from an observer's eye side;

$r_i$: radius of curvature of the i surface;

$d_i$: distance between the i surface and the (i+1) surface;

$n_i$: refractive index of the i lens with respect to line d;

$\nu_i$: Abbe number of the i lens.

In all of embodiments shown in this specification, the focal length of the whole lens system is set as 7.35 mm, the eyepiece magnification of the whole lens systems is set as 34 times, and the eye point distance is set as 15 mm.

A first embodiment of the eyepiece system according to the invention has a lens construction shown in FIG. 1. That is, the first embodiment is composed, when seen sequentially from an observer's eye (or eye point, E. P.), of a cemented lens $L_1 + L_2$ including a positive lens $L_1$ having two convex surfaces and a negative lens $L_2$ having a concave surface on the side of the eye point, and a meniscus positive lens $L_3$ which is spaced by an air distance $d_3$ from the cemented lens and has a convex surface facing toward the eye point.

In the drawings, reference character A designates an optical axis of an eyepiece system and I designates an image position. The image position I is situated in the end face of optical fiber bundle 10 on the eye point side, and to the end face is bonded a glass plate 12. The other end face of the optical fiber bundle 10 is located at the leading end of an insertion section of an endoscope and an image formed via an objective lens (not shown) provided at the leading end of the endoscope insertion section is transmitted through the optical fiber bundle 10 to the image position I on the eyepiece side. The first embodiment of the eyepiece lens is shown in the following table:

| m | r | d | n | $\nu$ |
|---|---|---|---|---|
| 1 | 8.621 | 5.50 | 1.55919 | 53.9 |
| 2 | −6.250 | 1.00 | 1.80518 | 25.4 |
| 3 | −20.492 | 4.76 | | |
| 4 | 4.302 | 3.00 | 1.77250 | 49.6 |
| 5 | 18.762 | | | |

$|f_1 \times f_2|/f^2 = 1.59$
$\nu_1 - \nu_2 = 28.5$
$N_3 = 1.77250$
$\nu_3 = 49.6$ The above-mentioned concrete construction provides aberration diagrams shown in FIGS. 2(A)-2(D).

Now, a second embodiment of an eyepiece system according to the invention is constructed so as to have a lens construction shown in FIG. 3. That is, the second embodiment is composed, when viewed sequentially from the eye point, of a positive lens $L_1$ having two convex surfaces, a meniscus negative lens $L_2$ spaced by an air distance $d_2$ from the positive lens $L_1$ and having a concave surface facing to the eye point side, and a meniscus positive lens $L_3$ spaced by an air distance $d_4$ from the meniscus negative lens $L_2$ and having a convex surface facing to the eye point side. The second embodiment of the eyepiece lens is shown in the following table:

| m | r | d | n | $\nu$ |
|---|---|---|---|---|
| 1 | 8.137 | 3.50 | 1.52141 | 71.8 |
| 2 | −10.401 | 0.30 | | |
| 3 | −8.551 | 1.00 | 1.91761 | 21.4 |
| 4 | −16.763 | 5.66 | | |
| 5 | 4.143 | 3.00 | 1.77250 | 49.6 |
| 6 | 13.465 | | | |

$|f_1 \times f_2|/f^2 = 3.50$
$\nu_1 - \nu_2 = 50.4$
$N_3 = 1.77250$
$\nu_3 = 49.6$ The aberration diagrams provided by the second embodiment are shown in FIGS. 4(A)-4(D).

Further, a third embodiment of an eyepiece system according to the invention is constructed so as to have a lens construction shown in FIG. 5. That is, the third embodiment is composed, when viewed sequentially from the eye point, of a cemented lens $L_1+L_2$ which includes a positive lens $L_1$ having two convex surfaces and a meniscus negative lens $L_2$ having a concave surface facing to the eye point side, and a meniscus positive lens $L_3$ spaced by an air distance $d_3$ from the cemented lens and having a convex surface facing to the eye point side. The third embodiment of the eyepiece lens is shown in the following table:

| m | r | d | n | υ |
|---|---|---|---|---|
| 1 | 8.654 | 5.50 | 1.52141 | 71.8 |
| 2 | −6.244 | 1.00 | 1.80518 | 25.4 |
| 3 | −16.22 | 5.09 | | |
| 4 | 4.237 | 3.00 | 1.77250 | 49.6 |
| 5 | 18.182 | | | |

$|f_1 \times f_2|/f^2 = 1.94$
$v_1 - v_2 = 46.4$
$N_3 = 1.77250$
$v_3 = 49.6$

The aberration diagrams provided by the third embodiment are shown in FIGS. 6(A)-6(D).

Still further, a fourth embodiment of an eyepiece system according to the invention is constructed so as to have a lens construction shown in FIG. 7. That is, the fourth embodiment is composed, when viewed sequentially from the eye point, of a cemented lens $L_1+L_2$ which includes a positive line $L_1$ having two convex surfaces and a meniscus negative lens $L_2$ having a concave surface facing to the eye point side, and a meniscus positive lens $L_3$ spaced by an air distance $d_3$ from the cemented lens and having a convex surface facing to the eye point side. The fourth embodiment of the eyepiece lens is shown in the following table:

| m | r | d | n | υ |
|---|---|---|---|---|
| 1 | 8.881 | 3.50 | 1.51633 | 64.1 |
| 2 | −6.757 | 1.0 | 1.80518 | 25.4 |
| 3 | −15.748 | 6.17 | | |
| 4 | 4.302 | 3.00 | 1.77250 | 49.6 |
| 5 | 15.260 | | | |

$|f_1 \times f_2|/f^2 = 2.30$
$v_1 - v_2 = 38.7$
$N_3 = 1.77250$
$v_3 = 49.6$

The aberration diagrams provided by the fourth embodiment are shown in FIGS. 8(A)-8(D).

Yet further, a fifth embodiment of an eyepiece system according to the invention is constructed so as to have a lens construction shown in FIG. 9. That is, the fifth embodiment is composed, when viewed sequentially from the eye point, of a cemented lens $L_1+L_2$ which includes a positive lens $L_1$ having two convex surfaces and a meniscus negative lens $L_2$ having a concave surface facing to the eye point side, and a meniscus positive lens $L_3$ spaced by an air distance $d_3$ from the cemented lens and having a convex surface facing to the eye point side. The fifth embodiment of the eyepiece lens is shown in the following table:

| m | r | d | n | υ |
|---|---|---|---|---|
| 1 | 8.460 | 5.50 | 1.55919 | 53.9 |
| 2 | −6.147 | 1.00 | 1.80516 | 25.4 |
| 3 | −20.308 | 4.60 | | |
| 4 | 4.328 | 3.00 | 1.76400 | 40.3 |
| 5 | 19.046 | | | |

$|f_1 \times f_2|/f^2 = 1.54$
$v_1 - v_2 = 28.5$
$N_3 = 1.76400$
$v_3 = 40.3$

The aberration diagrams provided by the fifth embodiment are shown in FIGS. 10(A)-10(D).

In addition, a sixth embodiment of an eyepiece system according to the invention is constructed so as to have a lens construction shown in FIG. 11. That is, the sixth embodiment is composed, when viewed sequentially from the eye point, of a cemented lens $L_1+L_2$, which includes a positive lens $L_1$ having two convex surfaces and a meniscus negative lens $L_2$ having a concave surface facing to the eye point side, and a meniscus positive lens $L_3$ spaced by an air distance from the cemented lens and having a convex surface facing to the eye point side. The sixth embodiment of the eyepiece lens is shown in the following table:

| m | r | d | n | υ |
|---|---|---|---|---|
| 1 | 8.684 | 3.50 | 1.51633 | 64.1 |
| 2 | −6.806 | 0.30 | 1.80518 | 25.4 |
| 3 | −16.266 | 5.95 | | |
| 4 | 3.687 | 3.00 | 1.62041 | 60.3 |
| 5 | 14.887 | | | |

$|f_1 \times f_2|/f^2 = 2.18$
$v_1 - v_2 = 38.7$
$N_3 = 1.62041$
$v_3 = 60.3$

The aberration diagrams provided by the sixth embodiment are shown in FIGS. 12(A)-12(D).

From the foregoing description, it can be clearly understood that the respective aberrations such as a spherical aberration and the like shown in FIGS. 2, 4, 6, 8, 10 and 12, in which the aberrations provided in the above-mentioned first to sixth embodiments of the invention are represented by the respective diagrams, are corrected quite properly. Although the eyepiece magnification is set as 34 times in all of the illustrated embodiments, according to the invention, the eyepiece magnification can be changed to other one by proportionally expanding or contracting the lens data of these embodiments.

In the first to sixth embodiments illustrated herein the diopter adjustment is performed by moving the first lens $L_1$, second lens $L_2$ and third lens $L_3$ in an integral manner.

As can be seen clearly from the foregoing description, according to the present invention, due to the fact that the lenses are constructed so as to satisfy the conditions (1)-(3), the present eyepiece system has such characteristics as necessary for an eyepiece system for an endoscope, such as correction of aberrations. Also, the present eyepiece system comprises three lenses, that is, it is simple in construction. Further, the present eyepiece system has a high eyepiece magnification and a sufficient eye point distance.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An eyepiece lens system having an eye point distance at least greater than the focal length f of the whole eyepiece lens system, said eyepiece lens system comprising;
   a doublet consisting of a biconvex lens $L_1$ and a negative meniscus lens $L_2$ having a concave surface facing the eye point side in this order when viewed from the eye point side, and
   a positive meniscus lens $L_3$ spaced a certain air space from said doublet and having a convex surface facing the eye point side, said air space being longer than the thickness of the center of said positive meniscus lens $L_3$.

2. An eyepiece system as set forth in claim 1, wherein a conditional expression:

$$1.5 < |f_1 \times f_2|/f^2 < 3.6$$

is satisfied,
   where, f is the focal length of the whole eyepiece system,
   $f_1$ is the focal length of the first lens element $L_1$ and,
   $f_2$ is the focal length of the second lens element $L_2$.

3. An eyepiece system as set forth in claim 2, wherein a conditional expression: $\nu_1 - \nu_2 > 25$ is satisfied,
   where, $\nu_1$ is the Abbe number of the first lens element $L_1$ and,
   $\nu_2$ is the Abbe number of the second lens element $L_2$.

4. An eyepiece system as set forth in claim 3, wherein a conditional expression: $N_3 > 1.6$, $\nu_3 > 40$ is satisfied, where, $N_3$ is the refractive index of the third lens element $L_3$ with respect to a line d and $\nu_3$ is the Abbe number of the third lens element $L_3$.

5. An eyepiece system as set forth in claim 4, wherein said first lens element $L_1$ and second lens element $L_2$ are combined to form a doublet.

6. An eyepiece system as set forth in claim 4, wherein said first lens element $L_1$ and second lens element $L_2$ are separated from each other.

7. An eyepiece system as set forth in claim 4, wherein said eyepiece system is for use in an endoscope.

8. An eyepiece system as set forth in claim 4, wherein the diopter adjustment of said eyepiece system is performed by integrally moving said first lens element $L_1$, second lens element $L_2$ and third lens element $L_3$.

9. An eyepiece system as set forth in claim 7, including means for securing the system in an endoscope.

* * * * *